Jan. 1, 1952
G. R. LOGAN
2,580,803
PHASE MEASURING DEVICE
Filed Jan. 12, 1950
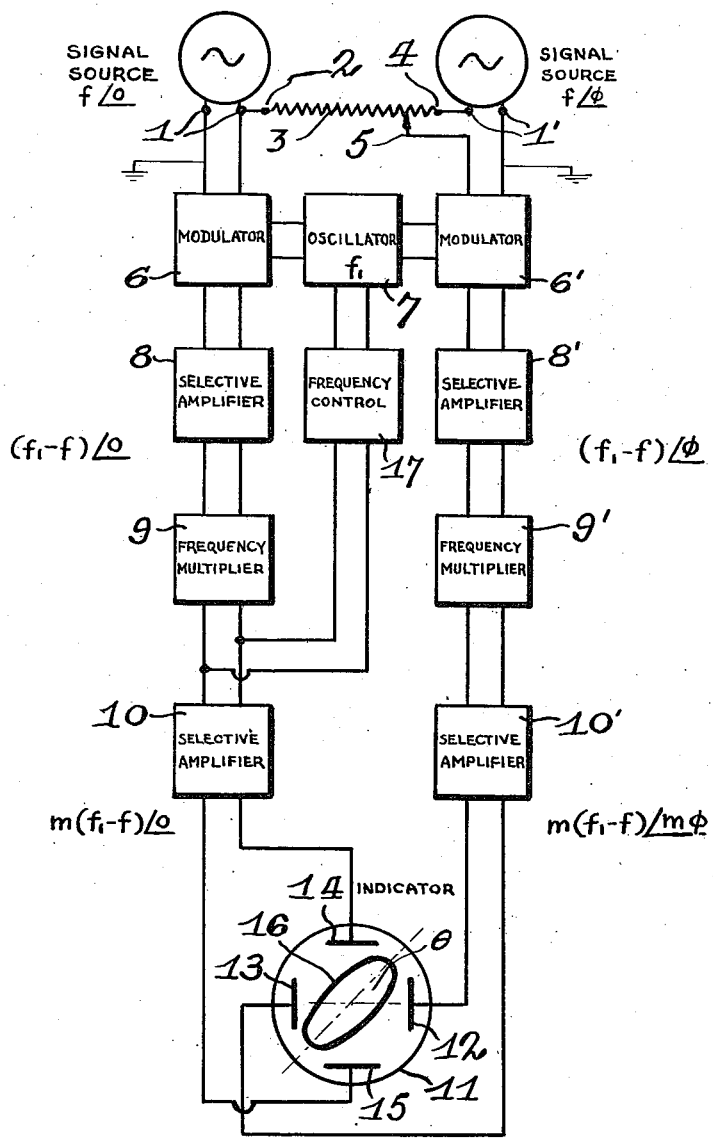
Inventor
G. R. LOGAN
By
Robert B. Harmon
Attorney Patented Jan. 1, 1952

2,580,803

UNITED STATES PATENT OFFICE 2,580,803

PHASE MEASURING DEVICE

George R. Logan, Belleville, Ontario, Canada, assignor to Northern Electric Company, Limited, Montreal, Quebec, Canada, a corporation of Canada Application January 12, 1950, Serial No. 138,179
In Canada December 2, 1949

4 Claims. (Cl. 172—245)

This invention relates to the measurement of difference in phase between alternating currents of identical frequency.

It is an object of this invention to provide a new and improved method of measuring the relative phase of two alternating currents with great accuracy.

It is a further object of this invention to provide means for multiplying angles of phase difference so that they may be read with greater facility on the indicator.

It is a further object of this invention to permit counting revolutions where the indicated angle may be greater than 360°.

It is a further object of this invention to provide means for making a zero reference or calibrating reading.

In the phase measuring system disclosed herein, the signals from the two sources that are to be compared may be passed through modulators in order to change the frequency to a value convenient for measurement. The lower side frequency is selected by means of suitable band filters or selective amplifiers. The resulting signals are thus changed in frequency from the original but their relative phase remains unchanged. The resulting signals are then passed through frequency multiplying circuits. This raises the frequency to some multiple of the lower side frequency at the same time multiplying the relative phase angle by a like amount. Thus for example if the frequency multipliers deliver the tenth harmonic of the lower side frequency, the relative phase angle at the output will be ten times the phase difference of the original signals. A filter or selective amplifier associated with the frequency multiplier is used to select the desired harmonic.

The same harmonic is selected from each of the two signals and these in turn are applied to a suitable phase indicator of which many varieties are known to the art. Thus the selected harmonic of the two signals may be applied respectively to the vertical and horizontal deflecting plates of a cathode ray tube. Since the frequencies of both deflecting voltages are the same, the Lissajous' figure produced thereby will be an ellipse. The inclination of an axis of the ellipse may be used to indicate the relative phase of the deflecting voltages. Other phase indicating devices such as the combination of a calibrated phase shifting network, and null indicator may be used, in a fashion well known to those skilled in the art.

The two signal sources that are to be compared are connected by a high impedance potentiometer. By this means one signal source may be fed simultaneously through the two paths leading to the phase indicator, thus providing a zero calibration or reference. By shifting the potentiometer the signals from the two sources may be fed each through separate paths to the phase indicator. The phase difference of the original signals is given by the difference of the readings on the phase indicator with the potentiometer in the two extreme positions divided by the multiplying factor used in the frequency multiplier.

Shifting the potentiometer causes the phase indicator to change continuously. Hence if the difference in phase multiplied by the factor of the frequency multiplier exceeds 360°, this will be observable. If a cathode ray type indicator is used, one may count the revolutions of the figure. If a null indicator is used, one may count the number of times the indicator passes through a minimum.

A further understanding of the invention may be had by reference to Fig. 1.

1 and 1' may be unbalanced input terminals for the two voltages $f$ angle zero and $f$ angle $\phi$ which are of the same frequency and differ in phase by the angle $\phi$. 3 is a potentiometer connecting the high sides of the input terminals 1 and 1'. 2 and 4 are the extreme positions of the potentiometer wiper 5. 6 and 6' are modulators driven by a common oscillator 7 of frequency $f_1$. 8 and 8' are selective amplifiers for selecting the lower side frequency $(f_1-f)$. The amplifiers may have a volume control function. 9 and 9' are frequency multipliers which in conjunction with selective amplifiers 10 and 10' produce and select the desired harmonic of $(f_1-f)$ designated $m(f_1-f)$. Amplifiers 10 and 10' restore the signal level to a value suitable to drive the phase indicator 11. In the illustrative circuit shown, 11 is a cathode ray tube but may of course be any other phase indicating device.

12—13 and 14—15 are respectively the horizontal and vertical deflecting plates of the cathode ray tube. 16 represents the figure produced on the screen of the cathode ray tube. 17 is an automatic frequency control which may be employed to stabilize oscillator 7 so that the signals are maintained in the centre of the pass band. The use of automatic frequency control 17 is optional.

For simplicity the components of the system represented by blocks in the drawing are presumed to have zero phase shift. This will not be strictly the case in practice, but since a zero calibration is made any phase shift contributed by the test circuit may be neglected.

To perform the test, the two voltages to be compared are connected to inputs 1 and 1' respectively. Wiper 5 is moved to position 2 and the inclination of figure 16 noted. Let this inclination be designated $\theta$. Then wiper 5 is moved toward position 4. The complete revolutions of figure 16 are noted and the final inclination $\theta'$ with wiper 5 at position 4 noted. The phase difference $\phi$ between $f$ angle zero and $f$ angle $\phi$ is then given by the expression $$\phi = \frac{(\theta' - \theta) + 2\pi n}{m}$$

where $\theta'$ and $\theta$ are respectively the final and initial inclinations of the figure 16, $n$ is the number of complete revolutions of figure 16 and $m$ is the multiplying factor of frequency multipliers 9 and 9'.

The impedance of potentiometer 3 must be large compared to the impedance looking into modulators 6 and 6'. Thus if all impedances are resistive and the potentiometer impedance is larger by a factor of 50, an error of the order of 0.5 degree will be introduced for a $\phi$ of 45°. If the potentiometer impedance is larger by a factor of 500, an error of the order of 0.1 degree is introduced for a $\phi$ of 45°.

What is claimed is:

1. In combination, in a system for measuring the difference in phase between two alternating currents of the same freqency, input means for each of said currents, modulating means driven by a common oscillator for changing separately the frequency of said currents without changing their relative phase, means for separately and selectively amplifying each lower side frequency thus obtained, means for separately multiplying the frequency and relative phase an integral number of times of each lower side frequency, means for separately and selectively amplifying a predetermined harmonic of each lower side frequency, means for indicating the relative phase of said harmonics, means connecting the two sources of alternating current together in such fashion that the first source may be transmitted with little loss to both said input means and that the second source has inserted in its path a very high loss, said connecting means being continuously variable in such fashion that subsequently each of the two sources of alternating current may be transmitted with little loss to its respective input means and that a very high loss is inserted between the two sources, and that during the variation of the connecting means, the indicator changes continuously.

2. In combination, in a system for measuring the difference in phase between two alternating currents of the same frequency, a phase indicating device having input terminals corresponding to each alternating current, a transmission path leading from each source of alternating current to respective input terminals of the phase indicating device, each of said transmission paths having connected in tandem an input, a modulator driven by a common oscillator, a selective amplifier tunable to the difference frequency of the said oscillator and said source, a harmonic generator, a selective amplifier tunable to a predetermined harmonic of said difference frequency, an output connected to the respective input of the phase indicating device, a potentiometer consisting of a resistance element and a wiper positionable along the resistance element, said resistance element having a large value compared to the impedance of the said transmission paths at the input to said modulators, said resistance element being connected between the two sources of alternating current, and said wiper completing the transmission path into one of said modulators.

3. In a system for measuring the difference in phase between a first signal and a second signal of like frequency, having an input for each of said signals and means connecting said inputs to a phase comparing device, a positionable potentiometer bridging said inputs, said potentiometer providing means in one position whereby said first signal may be directed to both inputs to the exclusion of said second signal and being continuously variable to a second position such that said first signal and said second signal are directed to respective inputs.

4. In a system for measuring the difference in phase as described in claim 3, a potentiometer as described, said potentiometer including a resistance element and a wiper, said resistance element having a value large compared to the input impedance of said measuring system.

GEORGE R. LOGAN.

REFERENCES CITED

The following references are of record in the file of this patent:

UNITED STATES PATENTS

| Number | Name | Date |
|---|---|---|
| 2,202,885 | Zuschlag | June 4, 1940 |
| 2,407,475 | Charrier | Sept. 10, 1946 |
| 2,484,824 | Hansel | Oct. 18, 1949 |